United States Patent [19]
Stockman

[11] Patent Number: 6,014,308
[45] Date of Patent: Jan. 11, 2000

[54] METALLIZED POLYMER FILM CAPACITOR HAVING A HIGH VISCOSITY POLYURETHANE OIL INSULATING FLUID

[75] Inventor: Robert Stockman, St. Augustine, Fla.

[73] Assignee: American Radionic Co., Inc., Palm Coast, Fla.

[21] Appl. No.: 09/181,476

[22] Filed: Oct. 25, 1998

[51] Int. Cl.[7] .............................. H01G 4/32; H01G 4/30; H01G 4/22

[52] U.S. Cl. ...................... 361/301.5; 361/303; 361/312; 361/313; 361/314; 361/317; 361/319

[58] Field of Search .............................. 361/301.1, 301.5, 361/317, 315, 314, 303, 305, 311–313, 316, 319; 29/25.42

[56] References Cited

U.S. PATENT DOCUMENTS

| | | | |
|---|---|---|---|
| 5,041,942 | 8/1991 | Carrico | 29/25.42 |
| 5,349,493 | 9/1994 | Winsor, IV | 252/62.2 |
| 5,440,446 | 8/1995 | Shaw et al. | 361/272 |
| 5,614,111 | 3/1997 | Lavene | 29/25.42 |
| 5,615,078 | 3/1997 | Hudis et al. | 361/313 |
| 5,737,179 | 4/1998 | Shaw et al. | 361/301.5 |

*Primary Examiner*—Kristine Kincaid
*Assistant Examiner*—Eric W. Thomas
*Attorney, Agent, or Firm*—Ware, Fressola, Van Der Sluys & Adolphson

[57] ABSTRACT

A metallized film capacitor is provided with a polyurethane oil insulating fluid. The insulating fluid has a viscosity in the range of about 500 to 3000 poise at 25° C. The polyurethane oil insulating fluid is produced by reacting an organic polyisocyanate with a primary polyol selected from the group consisting of castor oil, ricinoleic acid derivatives of castor oil and mixtures thereof. The reaction may be carried out in the presence of a secondary polyol chain extender such as a hydroxy-terminated polybutadiene diol. The reaction to produce the insulating fluid is carried out under conditions wherein the ratio of NCO groups of the organic polyisocyanate to OH groups of the primary and secondary polyols, if present, is in the range of about 0.1 to 1 to about 0.6 to 1. The ratio ensures that there is no excess of unreacted NCO groups in the insulating fluid and that the reaction produces a viscous fluid, not a substantially solid elastomer.

18 Claims, 2 Drawing Sheets

METALLIZED POLYMER FILM CAPACITOR HAVING A HIGH VISCOSITY POLYURETHANE OIL INSULATING FLUID

BACKGROUND OF THE INVENTION

1. Field of the Invention

The present invention generally relates to capacitors. More particularly the present invention relates to a metallized film capacitor having a high viscosity polyurethane oil insulating fluid surrounding at least a portion, and preferably all, of its capacitive element.

2. Description of the Related Art

Metallized film capacitors are typically used for starting and running motors and are also used in lighting applications. The capacitive element of a metallized film capacitor is typically formed by very tightly co-rolling two polymer films having metal layers deposited thereon around a core to form two spaced apart electrodes. Generally, the tightly co-rolled metallized polymer films are placed in a container, which is typically metal. Electrical leads are connected between the metal sprayed ends of the metallized polymer films and terminals mounted on a top. The container is filled with an insulating fluid and the top is sealed to the container. In some capacitors, insulative sheetlike material may be placed in the container between the co-rolled metallized polymer films and the metal container. Also, in some capacitors, a pressure activated circuit interrupter is employed.

The insulating fluid must be compatible with the polymer film forming the metallized film capacitor element in the event that such fluid contacts the film. Compatibility with the polymer film means that the fluid must not act as a solvent towards the polymer film. It is believed that fluids that act as a solvent towards the polymer film, which is typically formed from a polyolefin such as polypropylene, can cause swelling and wrinkling of the film, which is undesirable because it can lead to premature capacitor failure. The insulating fluid should have good heat transfer capability, sufficient viscosity to impede leaking and suitable compatibility with outgassing byproducts caused by corona discharge and clearing phenomena. Also, the fluid should not attack the metal on the metallized polymer film.

SUMMARY OF THE INVENTION

It is an object of the present invention to provide a metallized film capacitor with an insulating fluid that is compatible with the materials forming the capacitive element of the metallized film capacitor.

This object is accomplished, at least in part, by providing a metallized film capacitor formed, in part, by a container having a pair of terminals adapted for connection to an electrical circuit. A capacitive element, formed from a pair of tightly co-rolled metallized polymer films, is disposed in the container. A pair of electrical leads are electrically and operatively connected between the pair of metallized polymer films and the pair of terminals on the container. A polyurethane oil insulating fluid is disposed in the container to surround at least a portion of the capacitive element. The polyurethane oil insulating fluid has a viscosity in the range of about 500 to 3000 poise at 25° C. The polyurethane oil insulating fluid is obtained by reacting an organic polyisocyanate with a polyol selected from the group consisting of castor oil, ricinoleic acid derivatives of castor oil, and mixtures thereof. If desired, the reaction can be carried out in the presence of a secondary polyol chain extender. The reaction to produce the insulating fluid is carried out under conditions wherein the ratio of NCO groups of the organic polyisocyanate to the OH groups of the primary and secondary polyols, if present, is in the range of about 0.1 to 1 to about 0.6 to 1.

BRIEF DESCRIPTION OF THE DRAWINGS

The drawings, not drawn to scale, include.

DETAILED DESCRIPTION OF THE INVENTION

Figure 1:
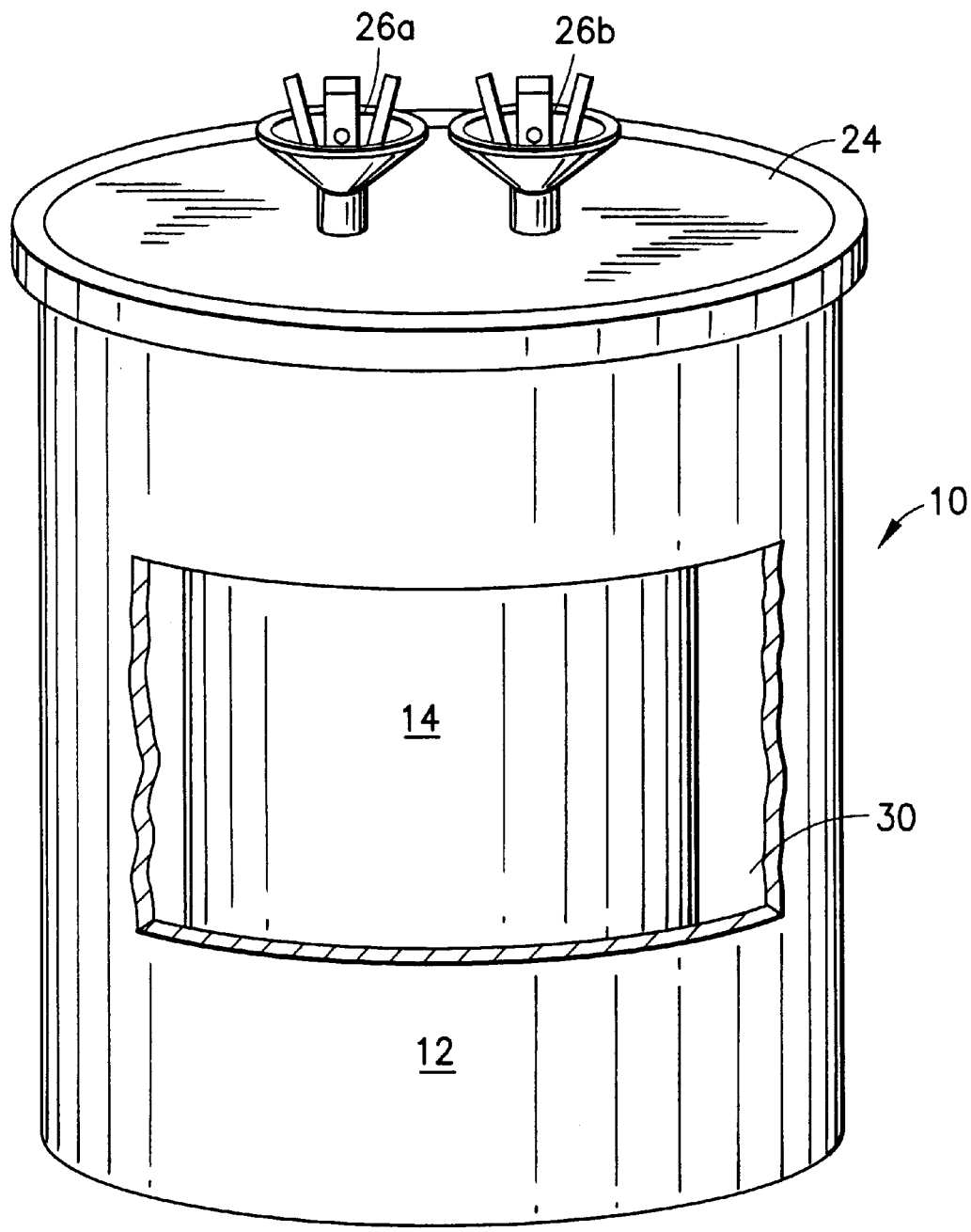
FIG. 1 which is an illustration of a metallized film capacitor, including a section thereof.
Figure 2:
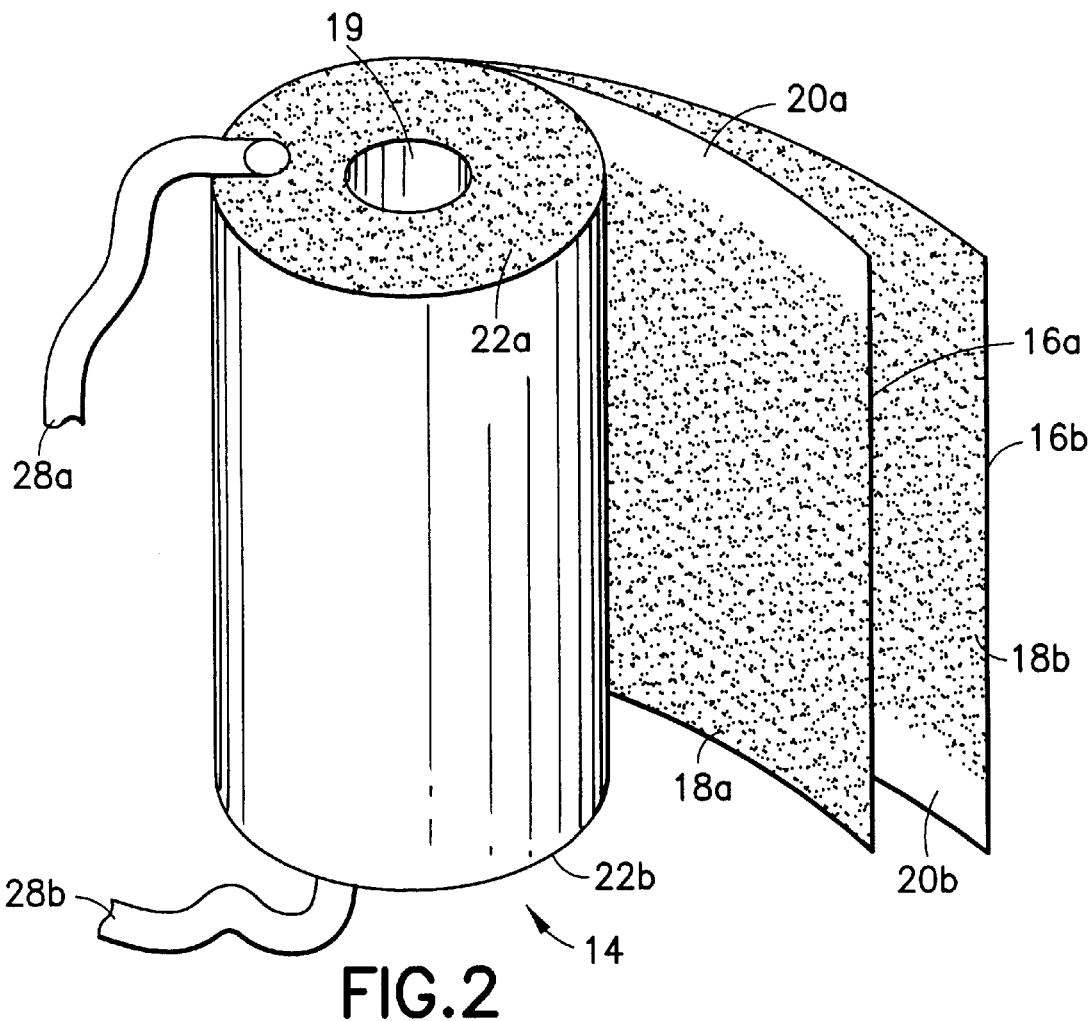
FIG. 2 which is an illustration of a typical capacitive element formed by tightly co-rolled metallized polymer films.
Figure 3:
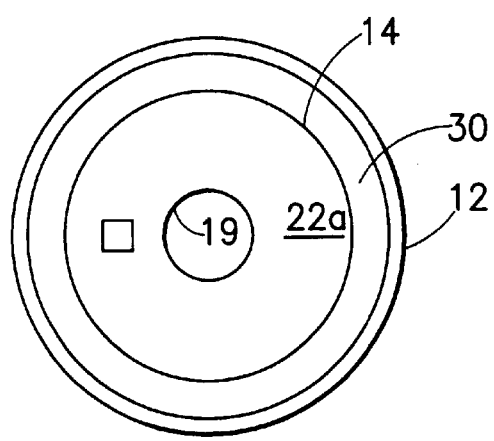
FIG. 3 which is a top view of the capacitive element disposed in a round shaped container.

The present invention provides a metallized film capacitor having a polyurethane oil insulating fluid that is compatible with the polymer substrate and metal material forming the metallized film. Referring to FIGS. 1 and 2, there is shown a metallized film capacitor 10. The capacitor 10 is formed, in part, by a container 12 having an open top in which a capacitive element 14 is disposed. The container 12 may be cylindrically shaped as illustrated or formed to have any other shape that a particular application should require. As is well known in the art, the capacitive element 14 is formed by tightly co-rolling two polymer films 16a, 16b that have metallized surfaces 18a, 18b, as illustrated, around a mandrel 19. Preferably, the polymer forming the films 16a, 16b is a polyolefin such as polypropylene, however, a polyester, such as Mylar™ could be used without departing from the scope of the present invention. Also, preferably, the metal for metallizing the surfaces of the polymer films 16a, 16b is zinc or a zinc alloy, however, aluminum may also be used. Metallized dielectric films suitable for forming the capacitive element in the present invention include: a film designated by the product code CM-ZTA2 produced by Toray Plastics America, Inc. of North Kingstown, Rhode Island; a film designated by the product code TERFOL PZXB produced by Tervakoski Dielectric, Ltd. of Tervakoski, Finland; and a film designated by the product code ZINC/HELV produced by Steinerfilm, Inc. of Williamstown, Mass. The metallized surfaces 18a, 18b of each of the polymer films 16a, 16b are laterally offset from each other so that the respective metallized surfaces 18a, 18b terminate at opposite edges of the capacitive element 14. Accordingly, each of the films 16a, 16b have metal free margins 20a, 20b at opposite ends of the capacitive element. The ends 22a, 22b of the capacitive element 14 are typically covered with a metal, applied as a spray or solder. End 22a is in electrical contact with the metallized surface of film 16a while end 22b is in electrical contact with the metallized surface of film 16b. The capacitor 10 illustrated in FIG. 1 also includes a lid 24 that is adapted to sealably cover the open top of the container 12. The lid 24 further includes a pair of electrical terminals 26a, 26b affixed thereto. A pair of electrical leads 28a, 28b are operatively connected between the pair of electrical terminals 26a, 26b and the ends 22a, 22b of the capacitive element 14 in an ordinary manner. Those skilled in the art will appreciate that variation in the container and lid configurations may be made without departing from the scope of the invention.

A polyurethane oil insulating fluid 30 is disposed in the container so as to surround at least a portion, and preferably all, of the capacitive element 14. In most applications, the quantity of fluid disposed in the container will be chosen to completely surround the capacitive element 14. The insulating fluid 30 generally has a viscosity in the range of about 500 to 3000 poise at 25° C., and preferably, the viscosity is in the range of about 1900 to 2500 poise at 25° C. The insulating fluid 30 is produced by reacting a primary polyol, such as castor oil, a ricinoleic acid derivative thereof or a combination of both, with an organic polyisocyanate. The reaction may be carried out in the presence of a secondary polyol which acts as a chain extender for the urethane polymerization. Organic polyisocyanates that can be utilized to produce the insulating fluid include: aliphatic polyisocyanates, cycloliphatic polyisocyanates, aromatic polyisocyanates, polymethyleneisocyanates, polyphenylisocyanates, methylenediisocyanates and any organic polyisocyanates that are prepolymers prepared by reacting a polyisocyanate with any polyol in quantities such that the NCO/OH ratio is greater than 1 to 1. A preferred secondary polyol is hydroxy-terminated polybutadiene diol because it demonstrates outstanding electrical and thermal expansion properties as well as provides structural support to the resulting polymeric matrix.

Preferably, the overall NCO/OH ratio (OH groups of both primary and secondary polyols if present) to produce the high viscosity polyurethane oil will typically range from about 0.1 to 1 to about 0.6 to 1. The desired NCO/OH ratio and the particular polyisocyanate, primary and secondary polyol starting materials chosen for the reaction will dictate the final viscosity of the resulting polyurethane oil insulating fluid. Typically, any reaction done with an NCO/OH ratio higher than about 0.6 to 1 will produce a solid elastomeric material which is unsuitable for use as an insulating oil in metallized film capacitors.

The polyurethane oil insulating fluid 30 used in the present invention is not expected to provide any substantial dielectric properties to the capacitor as it is not intended to impregnate or otherwise penetrate into the capacitive element of the present invention. However, because the capacitive element 14 is not a hermetically sealed unit, under certain conditions of time, temperature and production techniques, it is possible that some insulating fluid 30 could migrate into the capacitive element 14 such that the insulating fluid 30 contacts the marginal edges, and in some instances, the few outer layers of the tightly wound metallized polymer films 16a, 16b. To the extent that some polyurethane oil insulating fluid 30 has made contact with the materials forming the capacitive element 14, it has not shown to have any material effects on the operation of the capacitor 10.

Three dual configuration 10/25 $\mu$F 370 VAC, zinc metallized polypropylene film capacitors were made with the high viscosity polyurethane oil insulating fluid as described above. The fluid was heated to about 100° C. before it was poured into the container. These capacitors were life tested under accelerated life test conditions. For the first 188 hours, the capacitors were tested at 80° C. and 450 VAC. After the first 188 hours, the capacitors were tested at 80° C. and 550 VAC. During this time, the capacitors were operated under conditions that simulated a weekly duty cycle of 16 hours on and 8 hours off over a 5 day period and then on for 24 hours for 2 days. This cycle was repeated through a maximum accelerated life test duration of 1892 hours. The hours with voltage applied were counted as test time. At the 188 hour mark, the average capacitance for the 10.0 $\mu$F configuration increased by about 0.77 percent and the average capacitance of the 25 $\mu$F configuration increased by about 1.16 percent. There was no significant change in the dissipation factor and none of the tested capacitors failed. At the end of the accelerated test, the capacitors were cut open and examined. The insulating fluid was not discolored, the outer turns of the rolled polypropylene film were not wrinkled and the metal on the film was not attacked. Under the same test conditions, the capacitance of the same capacitor configuration, but filled with Amoco H1900 polybutene insulating fluid instead of the high viscosity polyurethane oil, increased 0.70 and 1.15 percent respectively.

At the 1892 hour mark under the more accelerated testing conditions, the average capacitance for the 10.0 $\mu$F configuration increased by about 1.16 percent and the average capacitance of the 25 $\mu$F configuration increased by about 1.62 percent. The two configurations of the polybutene filled capacitor experienced an average capacitance increase of about 0.67 and 1.18 percent, respectively. The dissipation factor did not change appreciably.

Nine dual configuration 3.0/30 $\mu$F 370VAC zinc metallized polypropylene film capacitors were made with the high viscosity polyurethane oil insulating fluid as described above. The fluid was heated to about 95° C. before it was poured into the container. Also, six dual configuration zinc metallized polypropylene film capacitors were made with the Amoco H1900 polybutene insulating fluid instead of the polyurethane oil insulating fluid. All of these capacitors were life tested under accelerated life test conditions as described above up to 1396 hours.

At the end of 1396 hours, the average capacitance for the 3.0 $\mu$F configuration containing the high viscosity polyurethane oil insulating fluid increased by about 0.31. The average capacitance of the 30 $\mu$F configuration increased by about 0.71 percent. There was no significant change in the dissipation factor and none of the tested capacitors failed. At the end of the accelerated test, the capacitors were cut open and examined. The insulating fluid was not discolored, the outer turns of the rolled polypropylene film were not wrinkled and the metal on the film was not attacked.

Under the same test conditions, the capacitance of the six capacitors filled with Amoco H1900 polybutene insulating fluid instead of the polyurethane oil insulating fluid, increased by 0.40 and 0.48 percent respectively. There was no significant change in the dissipation factor during the life of the test.

It will thus be seen that the objects and advantages set forth above and those made apparent from the preceding descriptions, are efficiently attained and, since certain changes may be made in the above construction without departing from the scope of the invention, it is intended that the matter contained in the above description or shown in the accompanying drawings shall be interpreted as illustrative and not in a limiting sense. It is also to be understood that the following claims are intended to cover all of the generic and specific features of the invention herein described, and all statements of the scope of the invention which, as a matter of language, might be said to fall therebetween.

What is claimed is:

1. A metallized polymer film capacitor comprising:
   a container having a pair of terminals adapted for connection to an electrical circuit;
   a capacitive element formed from a pair of tightly co-rolled metallized polymer films disposed in the container;
   a pair of electrical leads electrically and operatively connected between the pair of metallized polymer films and the pair of terminals; and a polyurethane oil insulating fluid having a viscosity in the range of about 500 to about 3000 poise at 25° C. disposed in the container surrounding at least a portion of the capacitive element, the polyurethane oil being produced by reacting an organic polyisocyanate with a polyol selected from the group consisting of castor oil, ricinoleic acid derivatives of castor oil, and mixtures thereof, wherein the ratio of NCO groups of the organic polyisocyanate to OH groups of the polyol is in the range of about 0.1 to 1 to about 0.6 to 1.

2. The capacitor of claim 1, wherein the polymer forming the metallized polymer films is selected from the group consisting of polyolefins and polyesters.

3. The capacitor of claim 1, wherein the polymer is polypropylene.

4. The capacitor of claim 1, wherein the metal forming the metallized polymer films is selected from the group consisting of zinc and aluminum.

5. The capacitor of claim 1, wherein the organic polyisocyanate is selected from the group consisting of aliphatic polyisocyanates, cycloliphatic polyisocyanates, aromatic polyisocyanates, polymethyleneisocyanates, polyphenylisocyanates, methylenediisocyanates and organic polyisocyanates that are a prepolymer prepared by reacting an excess of a polyisocyanate compound and a polyol.

6. The capacitor of claim 1, wherein the polymer forming the metallized polymer films is polypropylene and the metal forming the metallized polymer films is zinc.

7. The capacitor of claim 1, wherein the viscosity of the insulating fluid is in the range of between about 1900 to about 2500 poise at 25° C.

8. The capacitor of claim 1, wherein the insulating fluid surrounds the entire capacitive element.

9. A metallized polymer film capacitor comprising:

a container having a pair of terminals adapted for connection to an electrical circuit;

a capacitive element formed from a pair of tightly co-rolled metallized polymer films disposed in the container;

a pair of electrical leads electrically and operatively connected between the pair of metallized polymer films and the pair of terminals; and a polyurethane oil insulating fluid having a viscosity in the range of about 500 to about 3000 poise at 25° C. disposed in the container surrounding at least a portion of the capacitive element, the polyurethane oil being produced by reacting an organic polyisocyanate with a primary polyol selected from the group consisting of castor oil, ricinoleic acid derivatives of castor oil, and mixtures thereof, in the presence of a secondary polyol chain extender, wherein the ratio of NCO groups of the organic polyisocyanate to OH groups of the primary and secondary polyols is in the range of about 0.1 to 1 to about 0.6 to 1.

10. The capacitor of claim 9, wherein the polymer forming the metallized polymer films is selected from the group consisting of polyolefins and polyesters.

11. The capacitor of claim 9, wherein the polymer is polypropylene.

12. The capacitor of claim 9, wherein the metal forming the metallized polymer films is selected from the group consisting of zinc and aluminum.

13. The capacitor of claim 9, wherein the organic polyisocyanate is selected from the group consisting of aliphatic polyisocyanates, cycloliphatic polyisocyanates, aromatic polyisocyanates, polymethyleneisocyanates, polyphenylisocyanates, methylenediisocyanates and organic polyisocyanates that are a prepolymer prepared by reacting an excess of a polyisocyanate compound and a polyol.

14. The capacitor of claim 9, wherein the polymer forming the metallized polymer films is polypropylene and the metal forming the metallized polymer films is zinc.

15. The capacitor of claim 9, wherein the secondary polyol chain extender is hydroxy-terminated polybutadiene diol.

16. The capacitor of claim 9, wherein the viscosity of the insulating fluid is in the range of between about 1900 to about 2500 poise at 25° C.

17. The capacitor of claim 9, wherein the insulating fluid surrounds the entire capacitive element.

18. A metallized polymer film capacitor comprising:

a container having a pair of terminals adapted for connection to an electrical circuit;

a capacitive element formed from a pair of tightly co-rolled zinc metallized polypropylene films disposed in the container;

a pair of electrical leads electrically and operatively connected between the pair of zinc metallized polypropylene films and the pair of terminals; and a polyurethane oil insulating fluid having a viscosity in the range of about 1900 to about 2500 poise at 25° C. disposed in the container completely surrounding the capacitive element, the polyurethane oil being produced by reacting an organic polyisocyanate selected from the group consisting of aliphatic polyisocyanates, cycloliphatic polyisocyanates, aromatic polyisocyanates, polymethyleneisocyanates, polyphenylisocyanates, methylenediisocyanates and organic polyisocyanates that are a prepolymer prepared by reacting an excess of a polyisocyanate compound and a polyol with a primary polyol selected from the group consisting of castor oil, ricinoleic acid derivatives of castor oil, and mixtures thereof in the presence of a hydroxy-terminated polybutadiene diol chain extender, wherein the ratio of NCO groups of the organic polyisocyanate to OH groups of the primary polyol and diol is in the range of about 0.1 to 1 to about 0.6 to 1.

* * * * *

UNITED STATES PATENT AND TRADEMARK OFFICE
CERTIFICATE OF CORRECTION

PATENT NO. : 6,014,308
DATED : January 11, 2000    PAGE 1 of 2
INVENTOR(S) : Stockman It is certified that error appears in the above-identified patent and that said Letters Patent is hereby corrected as shown below:

On the title page, under "References Cited" ([56]), after "U.S. PATENT DOCUMENTS" and before the first U.S. reference listed, please add the following references:

| | | |
|---|---|---|
| -- 2,327,372 | 08/1943 | Ruben |
| 2,706,742 | 04/1955 | Ehlers |
| 3,214,657 | 10/1965 | Davis |
| 3,254,282 | 05/1966 | West |
| 3,311,697 | 03/1967 | Quinn |
| 3,652,333 | 03/1972 | Warren |
| 3,833,978 | 09/1974 | Eustance |
| 3,933,705 | 01/1976 | Olstowski |
| 4,037,298 | 07/1977 | Flanagan et al. |
| Re. 30321 | Re. 7/1980 | Brauer et al. |
| 4,281,210 | 07/1981 | Brauer et al. |
| 4,305,111 | 12/1981 | Förster |
| 4,306,273 | 12/1981 | Maylandt et al. |
| 4,317,158 | 02/1982 | Dequasie |
| 4,327,395 | 04/1982 | Yagitani et al. |
| 4,459,637 | 07/1984 | Shedigian |
| 4,535,382 | 08/1985 | Wada et al. |
| 4,536,331 | 08/1985 | Shedigian |
| 4,538,208 | 08/1985 | Shedigian |
| 4,580,189 | 04/1986 | Dequasie et al. |
| 4,594,642 | 06/1986 | Ito et al. |
| 4,609,967 | 09/1986 | Shedigian |
| 4,609,969 | 09/1986 | Shedigian |
| 4,621,301 | 11/1986 | Shedigian |

UNITED STATES PATENT AND TRADEMARK OFFICE
CERTIFICATE OF CORRECTION

PATENT NO. : 6,014,308
DATED : January 11, 2000
INVENTOR(S) : Stockman

PAGE 2 of 2

It is certified that error appears in the above-identified patent and that said Letters Patent is hereby corrected as shown below:

```
4,626,959   12/1986   Shedigian et al.
4,642,731   02/1987   Shedigian
4,931,900   06/1990   Lobo et al.
4,990,586   02/1991   Case --
```

After "5,615,078 3/1997 Hudis et al......361/313" in the same section, please add the following reference:

-- 5,708,558   01/1998   Dequasie --

After the last U.S. reference, please add the following:

-- FOREIGN PATENT DOCUMENTS

```
827,955    02/1960   United Kingdom
853,941    11/1960   United Kingdom
25 34 232  02/1977   Germany --
```

Signed and Sealed this

Eighteenth Day of July, 2000

Attest:

Attesting Officer

Q. TODD DICKINSON
Director of Patents and Trademarks

UNITED STATES PATENT AND TRADEMARK OFFICE
CERTIFICATE OF CORRECTION

PATENT NO : 6,014,308
DATED : January 11, 2000
INVENTOR(S): Stockman

It is certified that error appears in the above-identified patent and that said Letters Patent is hereby corrected as shown below:

On title page, after "[22] Filed:" delete "Oct. 25, 1998" and insert -- Oct. 28, 1998 --.

Signed and Sealed this

Thirtieth Day of January, 2001

Attest:

Q. TODD DICKINSON

Attesting Officer

Director of Patents and Trademarks